Figure 1:
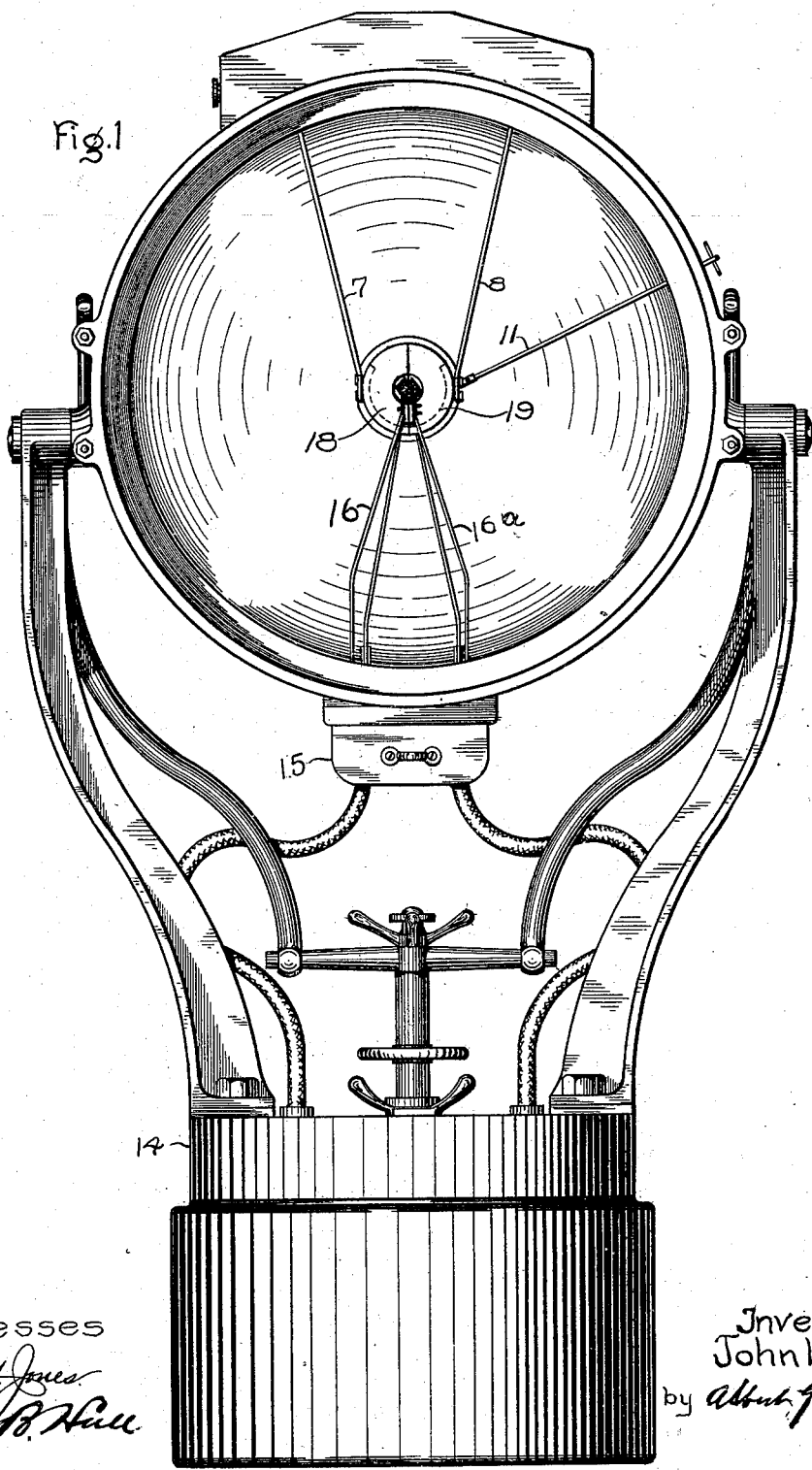

No. 654,625. Patented July 31, 1900.
J. L. HALL.
SIGNALING DEVICE.
(Application filed May 10, 1900.)

(No Model.) 2 Sheets—Sheet 1.

Witnesses

Inventor
John L. Hall
by Albert G. Davis
Atty

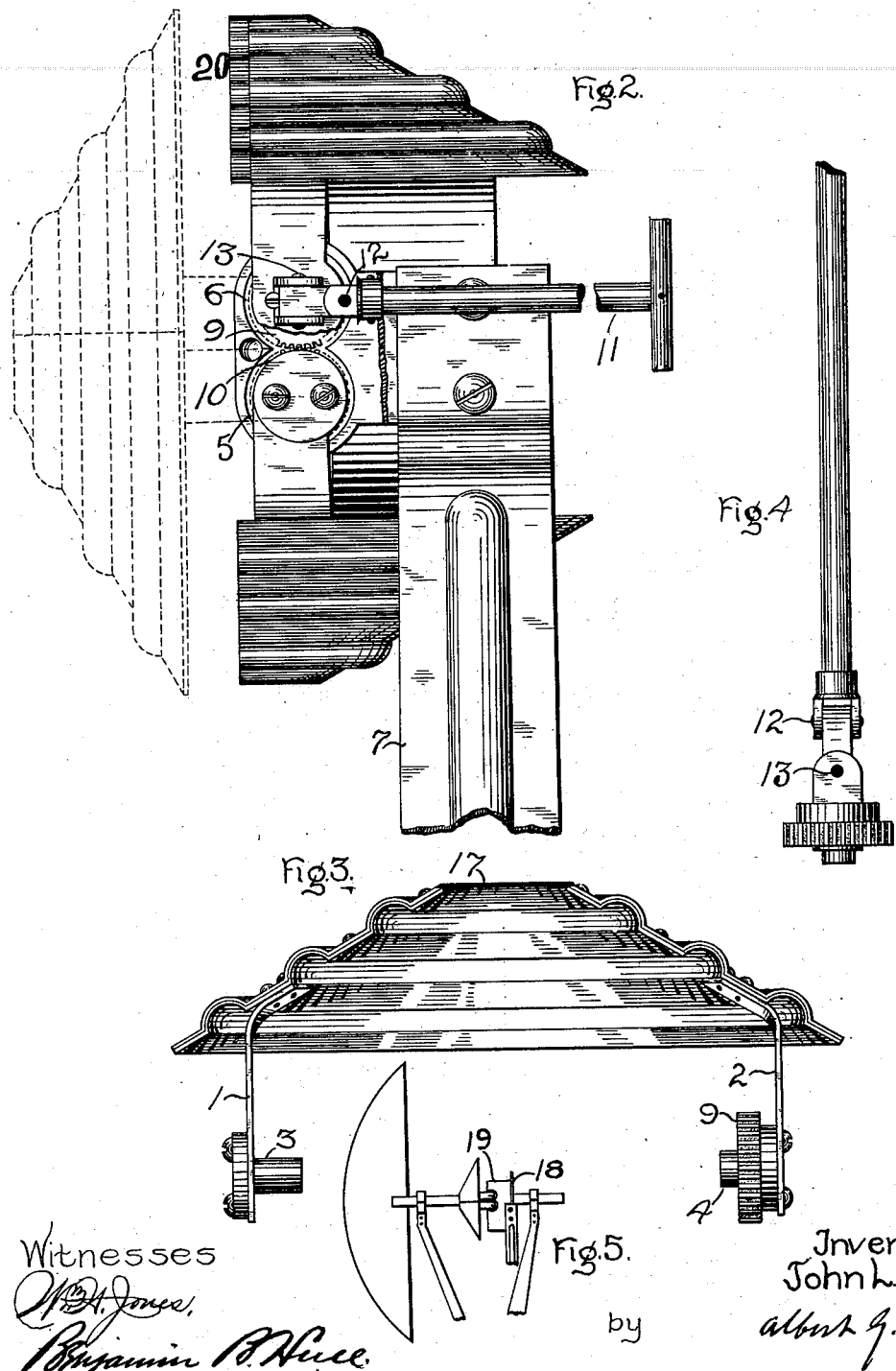

UNITED STATES PATENT OFFICE.

JOHN L. HALL, OF SCHENECTADY, NEW YORK, ASSIGNOR TO THE GENERAL ELECTRIC COMPANY, OF NEW YORK.

SIGNALING DEVICE.

SPECIFICATION forming part of Letters Patent No. 654,625, dated July 31, 1900.

Application filed May 10, 1900. Serial No. 16,112. (No model.)

*To all whom it may concern:*

Be it known that I, JOHN L. HALL, a citizen of the United States, residing at Schenectady, county of Schenectady, State of New York, have invented certain new and useful Improvements in Signaling Devices, (Case No. 1,324,) of which the following is a specification.

This invention relates to projectors, and has for its object to provide a simple shutter for cutting off or permitting the projection of the beam of light for signaling purposes. Projectors are commonly provided for accomplishing this result with a series of movable slats at the front which may be rocked to cut off the beam or to permit its transmission through the front lens. I accomplish the same result by mounting within the drum a sectional shutter provided with a controlling-handle on the outside, by which the arc or other source of light in the focus may be cut off by shifting the sections of the shutter to form an opaque diaphragm between the source of light and the mirror. In order to render this as small in size as practicable, I mount the two movable sections on pivots in or near a transverse plane to the source of light, the sections being shaped so that when brought together they will surround one of the arc-electrodes.

My invention therefore comprises a projector or signaling-shutter formed in sections and adapted to be shifted so as to interpose an opaque wall between the source of light and the mirror.

It comprises also other features, the novelty of which will be fully pointed out hereinafter and will be definitely indicated in the claims appended to this specification.

In the accompanying drawings, which illustrate my invention, Figure 1 is a front view of a standard electrically-trained projector to which my improvements have been applied. Fig. 2 is a side elevation of my shutter, it being shown open in full lines and in closed position in dotted lines. Fig. 3 is a side elevation of one of the shutter-sections. Fig. 4 is a detail view of the operating-handle, and Fig. 5 is a partial side elevation of the signaling parts.

As seen from Figs. 1 and 2, the shutter is composed of two sections, which when brought together form a diaphragm, the two parts of which are capable of rotation in a vertical plane. Each section is carried by two metal arms 1 2, (see Fig. 3,) in which are mounted pivots 3 4, turning in the walls of the box or case 5 6, Fig. 2, behind the obturator or screen 18 and supported on rods or brackets 7 8, secured to the inner wall of the drum. To one of the pivoted studs of each section is fastened a gear-wheel 9 10, the two wheels meshing together and being controlled by an operating-handle 11, extending through the projector-casing or drum. This handle connects with one of the gear-wheels by a universal joint, as indicated at 12 13, to permit the operating-handle to be led out of the drum at a convenient angle and to permit sufficient freedom of motion to prevent distortion due to warping or twisting of the supporting parts under the heat of the arc when the projector is in operation.

I have shown my improved shutter as mounted on a projector of the type in which the drum is trained through a horizontal or vertical angle by an electric motor contained in the base 14. Projectors of this kind are of known and standard construction and are provided with various hand-operating devices, as indicated in Fig. 1, for adjusting the projector, so that it may be motor or hand controlled. As these features have no direct bearing on my present invention, I deem it unnecessary to illustrate or describe them in detail.

The arc-regulating mechanism is contained in a casing 15, mounted on the bottom of the drum. It will be evident from an inspection of Figs. 1 and 2 that by twisting the operating-handle the shutters may be opened to the position shown in full lines or closed to that indicated in dotted lines. In the latter position an opaque wall is inserted between the arc and the mirror. The arc-electrodes are supported in the axis of the projector and adjusted by the regulating mechanism, which moves the electrode-supports 16 16$^a$. The shutter-sections are formed of sheet-iron spun into shape and corrugated to prevent warping or buckling and are provided at the narrow end with a semicircular edge 17, which should be lined with insulating material to prevent conductive relation to the negative electrode. This permits inclosure of the carbon electrode when the sections are brought together. A separate piece is riveted to one edge, as shown at the top of Fig. 2, at 20 to cover the joint when the shutter is closed. It will be noted that the shutter is open in front, which does not prevent it from entirely shutting off the beam of light. Such light as is seen is simply a glow, being only the light that may be reflected from the black walls of the drum and the black inside of the shutter, as all direct rays are stopped by the screen or obturator 18, attached to the magnet 19. This magnet is an open iron annulus magnetized by the current passing through the electrode which it incloses and which establishes a magnetic field in the neighborhood of the arc and prevents rotation or flaming of said arc. This is of common use in the art.

I prefer sheet-iron as the material employed for the shutter, as being better able than other common metals to withstand the great heat of the arc.

While the organization herein described is of especial advantage in such a class of signaling devices as search-light projectors, my improvements may also be applied to other types of signaling-lanterns, the main feature of my invention being to provide a sectional shutter between the source of light and the mirror by which the beams may be cut off or transmission permitted.

I claim—

1. A shutter for a search-light projector, or other signaling device composed of a plurality of sections of opaque heat-resisting material mounted to shift between the source of light and the mirror, and means operative from the outside of the regulating device to shift the sections, to cut off or permit reflection of the beam.

2. A search-light projector provided with a sectional shutter mounted within the drum, an operating-handle on the outside of the projector, and connections for shifting the shutter-sections to cut off or permit transmission of the beam from the reflector.

3. A signaling-shutter composed of pivoted semi-annular sections supported inside the casing and adapted to be closed to form an opaque wall between the arc and the mirror, and manual operating device outside the casing for rotating the sections to a position edgewise to the reflected beam.

4. A projector or lantern-shutter comprising two semi-annular sections mounted on arms pivoted in a support centrally of the reflected beam, and means for rotating the arms to close the sections between the arc and the mirror.

5. A projector or lantern-shutter comprising a plurality of sections of opaque material mounted on arms pivoted centrally of the beam, said arms being geared to a common operating-handle outside the drum.

6. A projector comprising a drum having arc-electrodes, a sectional shutter adapted to be closed between the arc and the mirror and an obturator in front of the arc.

7. A projector or lantern-shutter having within the casing a sectional shutter the parts of which are pivotally mounted, the several sections being closed forming a cone between the source of light and the mirror.

8. A projector or lantern-shutter formed of a plurality of corrugated sections of sheet metal adapted to fold or open between the source of light and the mirror.

In witness whereof I have hereunto set my hand this 7th day of May, 1900.

JOHN L. HALL.

Witnesses:
BENJAMIN B. HULL,
EDWARD WILLIAMS, Jr.